3,562,334
PRODUCTION OF STABLE DICHLOROACETAL-
DEHYDE
Sidney Berkowitz and John H. Blumbergs, Highland Park,
N.J., assignors to FMC Corporation, a corporation of
Delaware
No Drawing. Filed Sept. 21, 1964, Ser. No. 398,110
Int. Cl. C07c 45/24
U.S. Cl. 260—601
2 Claims

ABSTRACT OF THE DISCLOSURE

A high-purity dichloroacetaldehyde (DCA) is obtained which is stable against linear polymerization by maintaining the hydrogen chloride concentration at no greater than 0.5% by weight, maintaining the monochloroacetaldehyde concentration at no greater than 1% and by maintaining the DCA product free of metal impurities; if metal impurities are present, they can be neutralized by addition of effective amounts of either 2-benzothiazyl disulfide, thiourea or ethanolamine.

---

The present invention is concerned with production of dichloroacetaldehyde (DCA), which is stable against polymerization, by the chlorination of acetaldehyde or its cyclic polymers.

Dichloroacetaldehyde is employed as an intermediate in producing the insecticide, 1,1-di(4-chlorophenyl)-2,2-dichloroethane (DDD), which is an analogue of DDT. In this process, high-purity dichloroacetaldehyde is desirable in order to obtain a final product having a clear color and a good set point.

One current method for producing dichloroacetaldehyde (DCA) is carried out by chlorinating either paraldehyde or acetaldehyde in two successive steps, during which hydrogen chloride gas is evolved. In the initial step, at least stoichiometric quantities of chlorine are mixed in a first reactor with either acetaldehyde or paraldehyde, at a temperature of about 75–80° C. The partially chlorinated aldehyde is then transferred to a second vessel and there subjected to additional chlorination with excess chlorine. The amount of chlorine which is added is regulated in accordance with the rate of the chlorination reaction. This can be measured by analyzing the effluent gases to determine the quantity of hydrogen chloride which is present. The principal reaction which takes place is illustrated below:

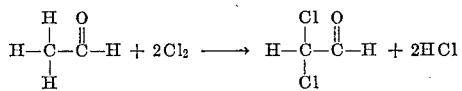

In addition to the principal reaction illustrated above, appreciable side reactions result in the formation of monochloroacetaldehyde (MCA), trichloroacetaldehyde (chloral), and high-boiling linear polymers.

The above reaction is normally carried out in the absence of a catalyst in order to prevent overchlorination of the acetaldehyde to chloral, and to prevent conversion of the DCA product to undesirable linear polymers.

One of the serious drawbacks of commercially-produced dichloroacetaldehyde is its tendency to convert to linear polymers upon standing for relatively short times, i.e. within about two weeks. It is possible to retard the linear polymerization of dichloroacetaldehyde during delivery by adding various stabilizers. However, these stabilizers are only effective for a limited amount of time and have the drawback of darkening the DCA product.

One method for producing a commercial dichloroacetaldehyde product that has unexpected, increased stability against linear polymerization is set forth in our co-pending application, Ser. No. 263,410, filed on Mar. 7, 1963 now Pat. No. 3,253,041 in the name of the present inventors. This application covers the chlorination of paraldehyde or acetaldehyde in the presence of from about 1 to about 10% by weight of phosphoric acid to form a dichloroacetaldehyde product which has materially reduced amounts of monochloroacetaldehyde and high-boiling polymer contaminants. This process unexpectedly yields a dichloroacetaldehyde product per se having increased stability against linear polymerization (a property which heretofore was unknown); however, it has been observed that from time to time occasional batches of the DCA product produced by this process do not have this desirable stability against linear polymerization. No satisfactory reason was found which explains the stability of certain DCA batches and the instability against linear polymerization of other DCA batches—even when produced by the same phosphoric acid process under virtually identical conditions. As a result, there is a need for a process which permits production of a DCA product that is completely resistant to linear polymerization upon extended storage, and which is in a substantially pure state.

We have now found that a dichloroacetaldehyde product can be obtained which is stable against linear polymerization by producing a DCA product containing no greater than 0.5% by weight of hydrogen chloride, no greater than 1.0% by weight of monochloroacetaldehyde, and which is either free of metallic impurities or whose metallic impurities have been effectively neutralized by the addition of an effective amount (up to about 50 p.p.m.) of either 2-benzothiazyl disulfide, thiourea or ethanolamine.

In carrying out the process of this invention the monochloroacetaldehyde (MCA) content of the DCA product is first reduced so that the product contains no more than 1% of MCA. This can be achieved either by chlorinating acetaldehyde or paraldehyde in the presence of phosphoric acid, thereby minimizing the amount of MCA obtained, or by fractionally distilling the DCA product from the chlorination chamber. This latter procedure is more difficult because monochloroacetaldehyde boils within 3° C. of the DCA product and necessitates a lengthy distillation procedure with excellent distilling equipment.

The preferred procedure is carried out by chlorinating acetaldehyde or paraldehyde in a plurality of reaction stages. While single-stage operation is possible, a two-stage procedure permits better chlorination and is the preferred embodiment. Paraldehyde is preferred as the feed material because it has a higher boiling point than acetaldehyde, and therefore, can be maintained at higher temperatures under atmospheric pressures.

In this preferred procedure, the paraldehyde is added to the first reactor and chlorine gas is added to the liquid contents of the reactor. The chlorine gas is normally added in stoichiometric amounts and hydrogen chloride and unreacted chlorine gas are removed overhead. Since the chlorination reaction is exothermic, cooling means are employed for maintaining the mixture at temperatures of between 75–80° C. The partially chlorinated product is then passed into a second stage where excess chlorine is passed through the solution until conversion to the dichloroacetaldehyde is completed.

The phosphoric acid catalyst can be added at either or both of the reaction stages, and is most conveniently introduced by adding it into the reaction vessel with the feed stream. The method of introduction into the reaction vessel is immaterial provided that the catalyst is present when chlorination takes place. The phosphoric acid catalyst is added in amounts of from about 1 to about 3½% by weight of the reaction mixture. Larger quantities of the catalyst can be added if desired (up to about 10%), but do not increase its effectiveness because of the limited solubility of phosphoric acid in the reaction mixture. Therefore, amounts of phosphoric acid over 3½% merely are helpful in assuring that the maximum solubility of phosphoric acid has been obtained in the reaction mixture. In general the phosphoric acid is added in as concentrated a form as possible with the 100% acid being preferred. The form of the phosphoric acid wether it be as the ortho-, meta-, or para-phosphoric acid is immaterial to the operation of the instant process.

The reaction can be carried out in either a continuous manner or in a batch process. Continuous operation is normally preferred since greater yields of product can be obtained with the same sized equipment. In a continuous process the catalyst is added constantly to the feed stream and the reaction mixture is maintained at a temperature of from about 50–85° C., the best results normally being obtained when temperatures of about 75–80° C. are utilized.

The resultant DCA product having an MCA content no higher than 1% is then refluxed in order to remove residual HCl in the product overhead. The refluxing operation is continued until the HCl content of the liquid product is no higher than 0.5% by weight. The resultant mixture is then distilled to remove the DCA product from high boiling impurities other than MCA and HCl. The resultant DCA product distillate is then analyzed to determine whether any metallic impurities are present. If no metallic impurities are detectable, the DCA product can be stored or shipped in that form without further treatment. However, if metal impurities are found such as iron or antimony compounds, e.g. $FeCl_3$ or $SbCl_3$, a stabilizer is required which will tie up the metallic impurities thereby preventing them from polymerizing the DCA product. Stabilizers which have been found effective for this purpose are 2-benzothiazyl disulfide, thiourea or ethanolamine in concentrations of up to about 50 p.p.m. of the stabilizer. In certain instances it is desirable to add the stabilizer even though there are no metallic impurities present in the DCA product to avoid the deleterious effects of impurities that may be encountered in the storage or shipping facilities used to house the DCA product. The resultant DCA product, which has an MCA content no greater than 1% by weight, an HCl content no greater than 0.5% by weight and up to 50 p.p.m. of a metals stabilizer, is completely stable against polymerization and will remain upon standing without linear polymerization.

The instant process achieves complete stability of the DCA product against linear polymerization by limiting the residual HCl content and MCA content, and by neutralizing any metal contaminants in the DCA product. The complete stability of the resultant DCA product is important to manufacturers of DCA because it eliminates the necessity for having to produce the DCA product within a limited time of the intended use. The instant process permits the manufacturer to produce DCA at his convenience and then store the product without danger of polymerization or degradation. In addition, any extended delays incurred during transit of the DCA product no longer are critical because it does not polymerize even upon prolonged standing. Unlike prior DCA products which merely are stabilized for a limited time, or which merely have some increased resistance to polymerization, the present DCA product is completely stable against the formation of linear polymers.

The following examples are given to illustrate the present invention and are not deemed limiting thereof.

EXAMPLE 1

Effect of MCA on DCA stability

Several samples of DCA product were prepared by chlorinating paraldehyde in the presence of 3% phosphoric acid as catalyst. The chlorination was carried out in a one-liter 4-necked flask equipped with stirrer, thermometer, Dry-Ice condenser, a dropping funnel and gas inlet tube leading from a calibrated flow meter connected to a chlorine cylinder. The flask was charged with 200 g. of a DCA "heel" from a previous run and with phosphoric acid. The mixture was heated to 70° C. in a hot water bath. Paraldehyde was placed in the dropping funnel and was added slowly to the reaction mixture with the simultaneous addition of stoichiometric amounts of chlorine. After the addition of paraldehyde was completed, the chlorination was continued at a chlorine feed rate of 1 g./min. for several hours, while maintaining the flask temperature at 75–80° C. Samples 1 to 6 were withdrawn at periodic intervals having various amounts of monochloroacetaldehyde present in the product. These samples were refluxed separately for 4 hours to remove the hydrogen chloride and then distilled to remove the high boiling impurities. The distillates were placed in separate brown glass bottles and stored at room temperature for several months. The product samples were analyzed before and after storage and are reported in Table I.

Sample 7 in Table I was prepared by fractional distillation of crude DCA product using a column 36" long and 1" O.D., filled with nickel packing. The middle fraction of the distillate was used as a sample and tested for its stability as set forth above.

The MCA, DCA and TCA content of the samples was determined by vapor phase chromatography. Analyses were made on an F and M Vapor Phase Fractometer, Model 500, using a column of 25% Octoil S on Celite PE 150048. The following conditions were used: helium flow 78 ml./min., column temperature 91° C., block temperature 300° C., port temperature 247° C., bridge power 150 milliamps. All areas were determined using methylene chloride as an internal standard. The results were calculated as weight percent.

The HCl content was determined by Valhardt's titration of chlorides and was calculated as hydrogen chloride.

The water content was determined by a modified Karl Fisher method according to the procedure outlined in Ind. and Eng. Chemistry, Analytical Edition, 19, 884 (1947).

TABLE I.—EFFECT OF MCA ON DCA STABILITY

| Sample No. | Analyses, wt. percent | Storage time, months | Appearance | Final analyses, wt. percent |
|---|---|---|---|---|
| 1 | DCA, 86.2<br>TCA, 0.5<br>MCA, 13.3<br>HCl, Trace<br>$H_2O$, Trace | 2 | Solid | |
| 2 | DCA, 85.1<br>TCA, 3.7<br>MCA, 11.2<br>HCl, Trace<br>$H_2O$, Trace | 4 | do | |
| 3 | DCA, 95.3<br>TCA, 0.8<br>MCA, 3.9<br>HCl, Trace<br>$H_2O$, Trace | 6 | do | |
| 4 | DCA, 95.1<br>TCA, 2.9<br>MCA, 2.0<br>HCl, Trace<br>$H_2O$, Trace | 7 | do | |
| 5 | DCA, 93.4<br>TCA, 5.5<br>MCA, 0.4<br>HCl, Trace<br>$H_2O$, Trace | 13 | Colorless liquid | DCA, 93.0.<br>TCA, 5.5.<br>MCA, 0.4.<br>HCl, Trace.<br>$H_2O$, |
| 6 | DCA, 94.4<br>TCA, 5.6<br>MCA, 0.0<br>HCl, Trace<br>$H_2O$, Trace | 7 | do | DCA, 94.4.<br>TCA, 5.6.<br>MCA, 0.0.<br>HCl, Trace.<br>$H_2O$, Trace. |
| 7 | DCA, 99.2<br>TCA, 0.1<br>MCA, 0.0<br>$CHCl_3$, 0.3<br>HCl, Trace<br>$H_2O$, 0.0 | 7 | do | DCA, 99.0.<br>TCA, 0.1.<br>MCA, 0.0.<br>$CHCl_3$, 0.3<br>HCl, Trace.<br>$H_2O$, 0.0. |

EXAMPLE 2

Effect of HCl on DCA stability

A number of samples were taken of the freshly distilled DCA product samples 6 and 7 from Example 1 and progressively measured amounts of dry hydrogen chloride gas were added to the samples. The samples were stored in brown glass bottles for several months and analyzed to determine their composition before and after storage. The results are presented in Table II:

EXAMPLE 3

To DCA product samples having MCA contents below 0.5% and containing essentially no HCl and $H_2O$ were added various amounts of $FeCl_3$ and $SbCl_3$ as polymerization initiators. Stabilizers were then added to some of the samples as set forth in Table III. The samples were then stored and analyzed in the same way as described in Example 1. The results are listed in Table III:

TABLE III.—EFFECT OF TRANSITION METALS ON STABILITY OF DCA PRODUCT

| Sample No. | Analyses wt. percent | Initiator added, p.p.m. | Stabilizer added, p.p.m. | Storage time | Appearance | Final analyses, wt. percent |
|---|---|---|---|---|---|---|
| 1 | DCA, 94.4<br>TCA, 5.6<br>MCA, 0.0<br>HCl, Trace<br>H₂O, Trace | None | None | 7 months | Colorless liquid | DCA, 94.4.<br>TCA, 5.6.<br>MCA, 0.0.<br>HCl, Trace.<br>H₂O, Trace. |
| 2 | DCA, 94.4<br>TCA, 5.6<br>MCA, 0.0<br>HCl, Trace<br>H₂O, Trace | 10 FeCl³ | do | 2 hours | Solid in 2 hours | |
| 3 | DCA, 94.4<br>TCA, 5.6<br>MCA, 0.0<br>HCl, Trace<br>H₂O, Trace | 10, SbCl³ | do | 18 hours | Solid in 18 hours | |
| 4 | DCA, 91.1<br>TCA, 8.0<br>MCA, 0.2<br>CHCl₃, 0.7<br>HCl, Trace<br>H₂O, 0.0 | 1,000, FeCl³ | do | 8 minutes | Solidified in 8 minutes | |
| 5 | DCA, 91.1<br>TCA, 8.0<br>MCA, 0.2<br>CHCl₃, 0.7<br>HCl, Trace<br>H₂O, 0.0 | 1,000, FeCl³ | 50, 2-benzothiazyl disulfide | 2 months | Pale yellow liquid | DCA, 89.8.<br>TCA, 8.0.<br>MCA, 0.2.<br>CHCl₃, 0.7.<br>HCl, Trace.<br>H₂O, 0.0. |
| 6 | DCA, 91.1<br>TCA, 8.0<br>MCA, 0.2<br>CHCl₃, 0.7<br>HCl, Trace<br>H₂O, 0.0 | 50, FeCl³ | 50, thiourea | do | do | DCA, 89.0.<br>TCA, 8.0.<br>MCA, 0.2.<br>CHCl₃, 0.7.<br>HCl, Trace.<br>H₂O, 0.0. |
| 7 | DCA, 91.1<br>TCA, 8.0<br>MCA, 0.2<br>CHCl₃, 0.7<br>HCl, Trace<br>H₂O, 0.0 | 50, FeCl³ | 50, ethanolamine | do | do | DCA, 87.5.<br>TCA, 8.0.<br>MCA, 0.2.<br>CHCl₃, 0.7.<br>HCl, Trace.<br>H₂O, 0.0. |

TABLE II.—EFFECT OF HCl ON THE STABILITY OF DCA PRODUCT

| Sample No. | Analyses, wt. percent | Storage time, months | Appearance | Final analyses, wt. percent |
|---|---|---|---|---|
| (Blank) | DCA, 94.4<br>TCA, 5.6<br>MCA, 0.0<br>HCl, Trace<br>H₂O, Trace | 7 | Colorless liquid | DCA, 94.4.<br>TCA, 5.6.<br>MCA, 0.0.<br>HCl, Trace.<br>H₂O, Trace. |
| 1 | DCA, 94.2<br>TCA, 5.5<br>MCA, 0.0<br>HCl, 0.4<br>H₂O, Trace | 7 | do | DCA, 94.1.<br>TCA, 5.4.<br>MCA, 0.0.<br>HCl, 0.4.<br>H₂O, Trace. |
| 2 | DCA, 94.0<br>TCA, 5.2<br>MCA, 0.0<br>HCl, 0.8<br>H₂O, Trace | 4 | Solid | |
| 3 | DCA, 93.0<br>TCA, 4.5<br>MCA, 0.0<br>HCl, 2.3<br>H₂O, Trace | 2 | Solid (cloudy after one month) | |
| 4 | DCA, 92.5<br>TCA, 4.3<br>MCA, 0.0<br>HCl, 3.0<br>H₂O, 0.0 | 1 | Solid (cloudy after 10 days) | |
| 5 | DCA, 9.4<br>TCA, 5.5<br>MCA, 0.4<br>HCl, Trace<br>H₂O, Trace | 13 | Colorless liquid | DCA, 93.0.<br>TCA, 5.5.<br>MCA, 0.4.<br>HCl, Trace.<br>H₂O, Trace. |
| 6 | DCA, 93.4<br>TCA, 5.8<br>MCA, 0.4<br>HCl, 0.3<br>H₂O, Trace | 13 | do | DCA, 93.0.<br>TCA, 5.5.<br>MCA, 0.4.<br>HCl, 0.3.<br>H₂O, Trace. |
| 7 | DCA, 98.9<br>TCA, 0.1<br>MCA, 0.0<br>HCl, 1.0<br>H₂O, 0.0 | 3 | Solid | |

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. A stable dichloroacetaldehyde product which does not form linear polymers which consists essentially of dichloroacetaldehyde, no more than 0.5% by weight of hydrogen chloride, no more than 1.0% by weight of monochloroacetaldehyde and which contains an effective amont of a stabilizer selected from the group consisting of 2-benzothiazyl disulfide, thiourea and ethanolamine.

2. A stable dichloroacetaldehyde product which does not form linear polymers which consists essentially of dichloroacetaldehyde, no more than 0.5% by weight of hydrogen chloride, no more than 1.0% by weight of monochloroacetaldehyde and which contains up to about 50 p.p.m. of a member of the group consisting of 2-benzothiazyl disulfide, thiourea and ethanolamine.

References Cited

UNITED STATES PATENTS

| 3,253,041 | 5/1966 | Berkowitz et al. | 260—601H |

FOREIGN PATENTS

| 832,146 | 2/1952 | Germany | 260—601H |
| 164,586 | 8/1963 | U.S.S.R. | 260—601H |

BERNARD HELFIN, Primary Examiner

R. H. LILES, Assistant Examiner

UNITED STATES PATENT OFFICE
CERTIFICATE OF CORRECTION

Patent No. 3,562,334                    Dated February 9, 1971

Inventor(s) Sidney Berkowitz and John H. Blumbergs

It is certified that error appears in the above-identified patent and that said Letters Patent are hereby corrected as shown below:

Column 3, line 10, "wether" should read --whether--.

Column 4, line 68, Table I, under column heading "Final Analyses, wt. percent", Sample No. 5, "$H_2O$," should read --$H_2O$, Trace--.

Column 5, Table II, under column heading "Analyses, wt. percent", Sample No. 5, "DCA 9.4" should read --DCA, 93.4--.

Column 5, throughought Table III, under column heading "Initiator added, p.p.m.", "$FeCl^3$" should read --$FeCl_3$--; also "$SbCl^3$" should read --$SbCl_3$--.

Signed and sealed this 25th day of December 1973.

(SEAL)
Attest:

EDWARD M. FLETCHER, JR.            RENE D. TEGTMEYER
Attesting Officer                  Acting Commissioner of Pate